3,620,109
MACHINE TOOL WITH FACING TOOL SLIDE FOR AUTOMATIC TOOL CHANGING
Alfred W. Dürr, Otto Gunsser, and Hubert H. Heller, Nurtingen, Wurttemberg, Germany, assignors to Gebruder Heller Maschinenfabrik G.m.b.H., Nurtingen, Wurttemberg, Germany
Original application Sept. 13, 1967, Ser. No. 667,441, now Patent No. 3,524,248, dated Aug. 18, 1970. Divided and this application July 15, 1969, Ser. No. 841,940
Int. Cl. B23b 3/22
U.S. Cl. 82—2 E                2 Claims

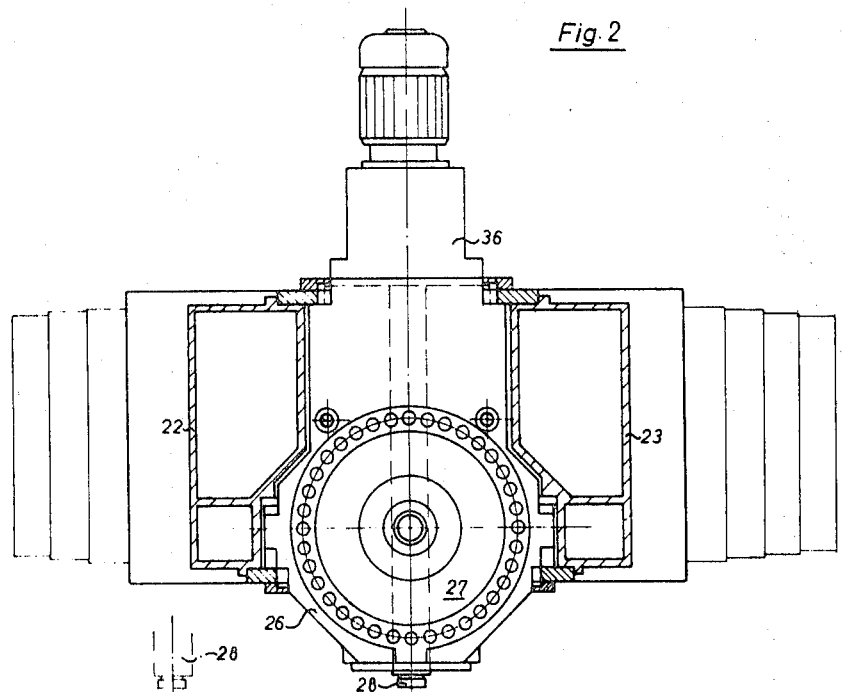
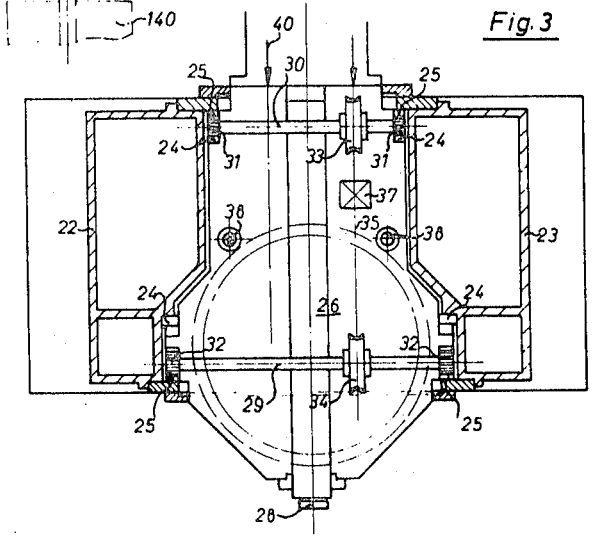

ABSTRACT OF THE DISCLOSURE

A machine tool with automatic tool changing is described with a tool holder having a central tightening screw and lock and a face slide including an indexing pin as well as two compensating weight threaded spindles.

---

Figure 1:
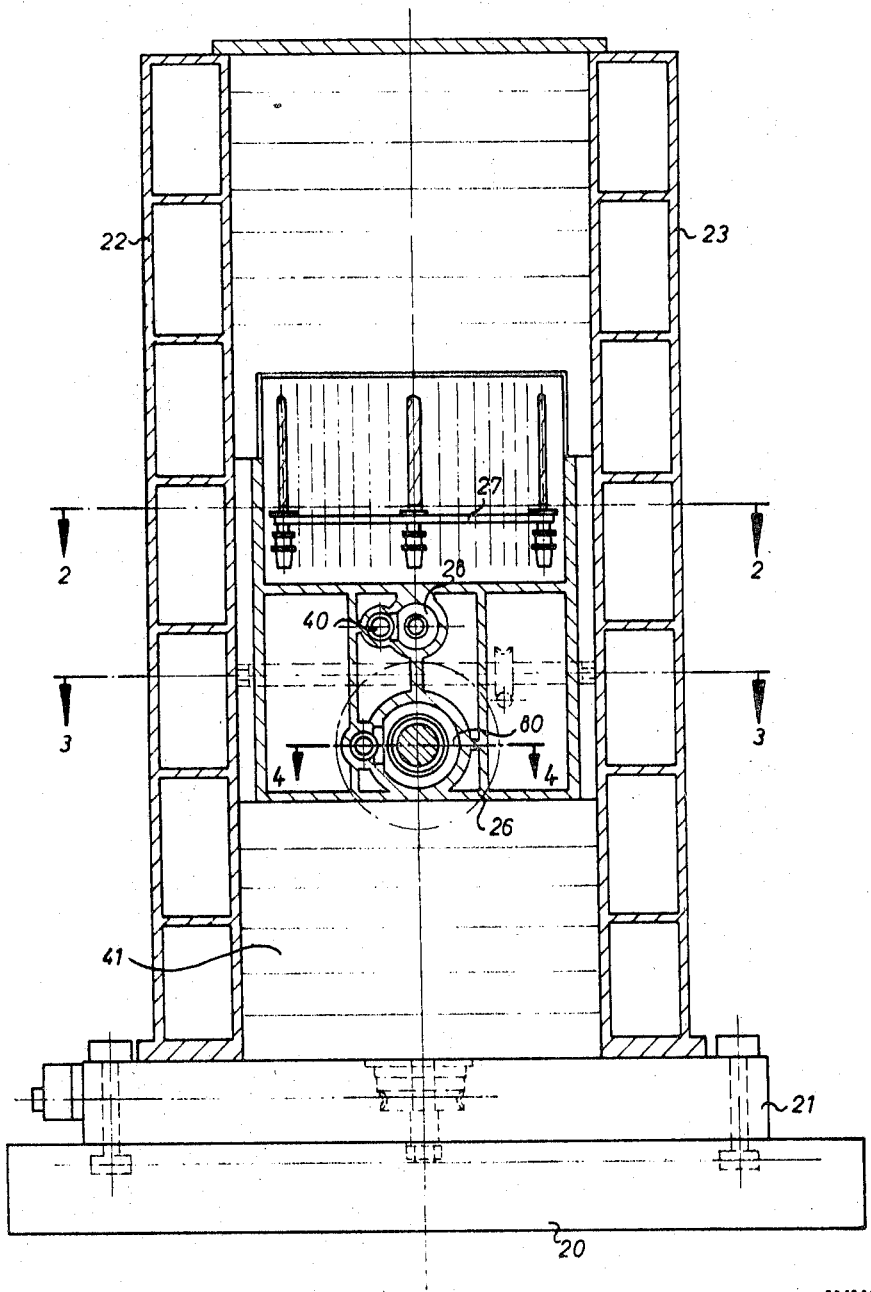

This application is a divisional application of our copending application Ser. No. 667,441, filed Sept. 13, 1967 and now Pat. No. 3,524,248.

The present invention relates to a machine tool with automatic tool changing and having a facing tool slide with compensating weights.

Since the tool is normally stationary in the face plate, it is possible to provide a tool changing mechanism of the type already known for a punching tool. (U.S. patent specification 2,363,208.) However in accordance with the invention it is preferable to provide a tool holder with a central tightening screw and a lock to prevent rotation of the tool when clamped in position in the face slide. The advantage is then obtained that in principle tool changing takes place in the same manner as when changing a tool in the main spindle; the tool holder is therefore preferably designed as a female taper with a gear rim to prevent rotation which acts in conjunction with a corresponding gear rim on the tool or tool holder, as has already been suggested for the tool holder of a tool spindle, i.e. for rotating tools.

Alternatively, or additionally in the case of tools with comparatively large radial elongation, the tool holder may, in accordance with a further embodiment of the invention, consist of an axially projecting flange which fits into a corresponding recess in the tool holder.

In order to change the tool in the face plate it is naturally essential for the face plate to take up a precisely defined position, quite apart from the fact that the face slide must also take up an accurately defined radial position, which can easily be achieved by means of the numerical control.

In order to determine a given position for the face plate, it is convenient to use an indexing pin; however, instead of allowing this pin to drop into a fitting bore on the periphery of the face plate in the normal manner, in accordance with a further embodiment of the invention the pin is arranged behind the face plate so that it can be moved hydraulically into a fitting bore at the back of the face plate. Consequently, the face plate can have a very large diameter without the space which is necessary in the radial direction being increased by the space for the indexing pin.

In addition, in accordance with a further embodiment of the invention, an indexing pin which is arranged behind the face plate and fits into a fitting bore at the back, may also be provided with a drive for rotation and may have a multi-edged head at its end which fits into the face plate, said head being insertable in a corresponding recess in the tightening screw in such a way that a joint with good torsional strength is established. As a result no separate actuation is necessary for the central tightening screw to fix the tool in position, so that the fixing system can be kept relatively simple.

When a tool holder with a central tightening screw is used, and in particular when a fitting bore is used on the back of the face plate, the face slide must be accessible from the back. In the position of action which is normally required, i.e. the centre of the face slide, the latter is not accessible in normal face plate designs, because the threaded adjusting spindle is arranged at this point. In order to make the centre of the back of the face slide accessible, in accordance with a further embodiment of the invention, the face slide is therefore guided on two threaded spindles which are arranged on either side of the central tightening screw.

Especially in the extreme position with maximum diameter, the face slide produces a considerable degree of imbalance on the face plate, and if work is to be carried out with fairly high cutting speed and in particular with relatively large turning diameters, it is necessary to compensate this imbalance. In accordance with a further embodiment of the invention, threaded spindles are therefore arranged on either side of the face slide; compensating weights for the face slides are guided on these spindles and are adjustable in the opposite direction to the face slide. Two compensating weight threaded spindles will preferably be provided in the plane of the face slide.

Figure 5:
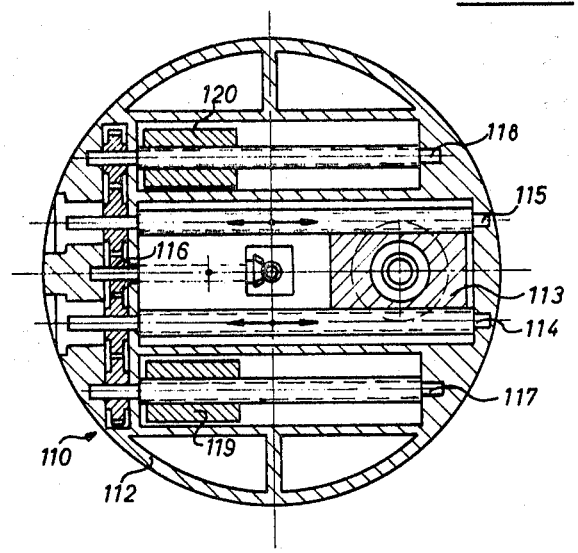
Figure 4:
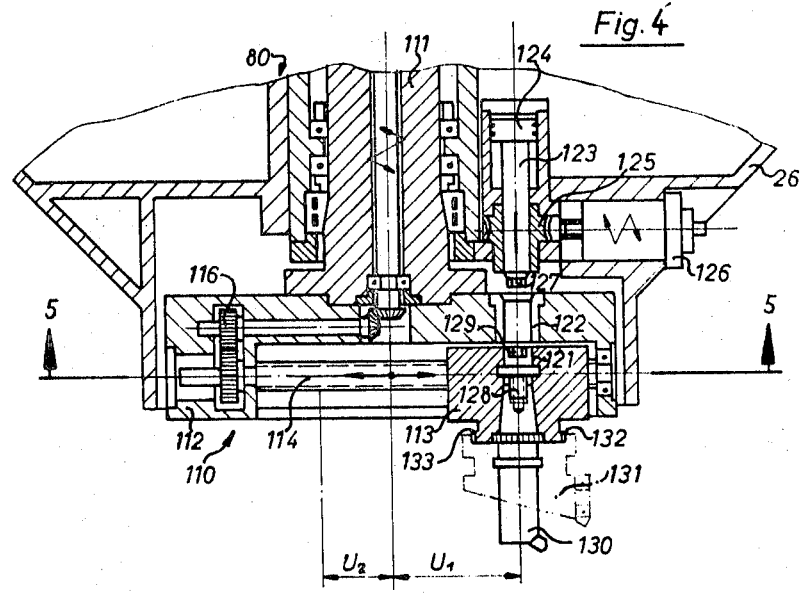

The invention will be described in greater detail on the basis of a practical embodiment shown by way of example in the drawing. The illustrations are as follows:

FIG. 1 shows a vertical section through a machine tool in accordance with the invention;
FIG. 2 is a sectional view along the line 2—2 in FIG. 1;
FIG. 3 is a sectional view along the line 3—3 in FIG. 1;
FIG. 4 is a partial sectional view along the line 4—4 in FIG. 1; and
FIG. 5 is a section along the line 5—5 in FIG. 4.

The machine tool shown in the drawing consists of a slide plate 21 which moves on a machine bed 20 in the horizontal, i.e. $x$ axis; two columns 22 and 23 are mounted on the slide plate and each column carries two guides 24 and two racks 25 aligned vertically; the machine tool also consists of a slide 26—guided and moving vertically up and down in said guides—which carries a tool magazine 27 and tool spindle 28. The slide 26 is equipped at the front and back with a drive shaft 29 or 30, on which in each case two pinions 31 or 32, which engage with one of the racks 25, are mounted. In addition the two shafts 29 and 30 each carry a worm wheel 33 or 34 which engages with a common worm shaft, which is indicated by its axis 35. This shaft 35 terminates in a drive box 36 at the $y$ feed drive.

Between the two worm wheels 33 and 34, the shaft 35 runs through an adjusting device 37, which operates in conjunction with an electronic spirit level of the known type which is not illustrated. Within the adjusting device 37 the shaft 35 is divided so that the two sections of the shaft can be rotated slightly in relation to each other.

In order to set a required position in the $y$ axis, the $y$ feed is brought into operation, the shaft 35 rotates, the two shafts 29 and 30 rotate accurately and uniformly and the slide moves up and down, its movement being controlled by the gear wheels 31, 32 and the racks 25. In order to relieve the load on the racks, two hydraulic relief cylinders 38 of the known type are arranged close to the centre of gravity of the slide. If the electronic spirit level signifies that the slide, i.e. primarily the tool spindle 28, is not precisely horizontal, e.g. is drawn downwards at the front by a tool with very large reach or very heavy weight, the adjusting device responds and rotates the front section of shaft 35 in relation to the rear section in such a way that the gear wheels 32 lift the front of the slide with the help of the racks 25. It is of course also possible to ascertain whether the centre tip of a particularly long tool has fallen out of alignment under its own weight, and by lifting the front of the slide in the manner described, it is possible to compensate such loss of alignment. Lifting of the front side is of course only possible within certain limits to ensure that the slide 26 does not jam in the guides 24 and damage the latter or the racks 25 and the gear wheels 31 or 32 which act in conjunction with the latter.

Above this $y$ adjusting device, a $z$ feed spindle 40 which extends approximately half way under the magazine 27 is arranged next to the spindle 28; this feed spindle 40 is indicated in FIG. 3 by its axis. The spindle engages in the usual manner in the spindle sleeve so that further description is superfluous.

The space below and above the slide 26, including the tool magazine is covered on all sides by telescopic metal panels 41, the design and arrangement of which do not require discussion in this specification.

The tool magazine 27 arranged above the tool spindle 28 consists in the practical embodiment of the invention illustrated here of a circular disc with recesses open towards the outside to hold tools which are arranged to rotate on a vertical shaft 47. Adjustment of the tool magazine 27 into the required position is effected in the normal way and therefore requires no further discussion here; the tools are mounted in the recesses which are open towards the outside.

Instead of the magazine 84 shown in FIG. 9 of said parent application, Ser. No. 667,411, for special tools a facing plate 110 may also be mounted in the bore 80, as shown in FIGS. 4 and 5. This unit consists of a shaft 111, the actual face plate 112 and a face slide 113, which can be radially adjusted.

The face slide 113 is guided between two threaded spindles 14, 115 which are driven by a common pinion 116 in the same way as the individual threaded spindle of a face slide normally provided. The centre of the face slide 113 therefore remains free so that the design which will be described later in connection with FIG. 4, can be obtained.

In the same plane as the face slide 113 and the two threaded spindles spindles 114 and 115, two further threaded spindles 117 and 118 are mounted in the face plate 112; these spindles are driven by pinions in the opposite direction to the face slide threaded spindles 114 and 115. On the threaded spindles 117, 118, compensating weights 119, 120 are guided and are displaced by the threaded spindles 117, 118 in the opposite direction to the face slide 113. The imbalance of the face plate which inevitably results from displacement of the face slide off center, is compensated by these compensating weights 119, 120 so that the face plate can operate with relatively high speeds, even if the face slide 113 occupies an extreme position. The compensating weights 119, 120 are dimensioned in such a way that the weight of the face slide in counterbalanced by a medium-heavy tool; in the case of particularly light tools, the compensating weights will therefore lead to a slight imbalance while in the case of unusually heavy tools, the tool itself will cause a slight imbalance. However, if work is primarily carried out with a specific tool or tools of a particular weight, the compensating weights should preferably be chosen to suit the latter.

In the extreme radial position shown in FIG. 4, a bore 121 on the back of the face slide 113 coincides with a fitting bore 122 in the face plate 112, which for its part assumes a position such that the fitting bore 122 is located in front of an index pin 123 in the slide 26. The index pin 123 is at the same time designed as a piston rod of a hydraulic piston 124. In addition the index pin 123 is mounted in a worm wheel 125 which can be brought into rotation by means of a worm drive 126, so that the index pin 123 is also rotated. At its end facing the face plate 112, the index pin 123 has a multi-sided head 127.

A clamping screw 128 is mounted in the bore 121 of the face slide 113 and has a recess 129 corresponding to the multi-sided head 127 at its back. In addition the face slide 113 has, in the same way as the tool spindle 28, an internal taper with a gear rim which acts in conjunction with a corresponding male taper and gear rim on the tool.

In order to change a tool, e.g. a lathe tool 130, for e.g. a heavier lathe tool support 131 (shown in dotted outline), the face plate 112 is brought with its bore 122 in front of index pin 123, and at the same time the face slide 113 is brought into the extreme radial position shown in FIG. 4. The index pin 123 is then introduced into the fitting bore 122 by means of the piston 124 and rotated slowly by means of the worm drive 126 through the worm 125, until the multi-sided head 127 engages in the recess 129. The drive 126 is then rotated in the direction required to release the clamping screw 128, so that the tool 130 is released and can be removed. The tool 131 is then inserted and clamped by reversing the sense of rotation of the worm drive 126; the index pin 123 is then drawn out of the holder 129 and the fitting bore 122 when pressure fluid acts on the piston 124 from the other side. The face slide is then brought into the specified position and the machining operation can begin.

In addition to the clamping taper, the holder of tool 131 also has an axial recess 132, into which an axially projecting flange 133 of the face slide 113 fits. The latter serves to protect the tool 131 against torsional movement, either in addition to a gear rim or in place of such a rim.

What is claimed is:

1. In a machine tool having automatic tool changing means and having a tool spindle provided with a facing head, wherein the improvement comprises an improved facing head for use with automatic tool changing means comprising an index pin mounted behind said facing head, said facing head having a fitting bore therein, means for introducing said pin into said fitting bore, a central tightening screw, a drive for rotating said index pin, and a multi-sided head at the end of said pin which penetrates into the facing head, said tightening screw having a multi-sided recess in the side facing said pin and said multi-sided head being insertable in said recess in order to establish a torsionally rigid joint.

2. In a machine tool having a tool spindle, a facing head adaptable with said tool spindle for automatic tool change, wherein said facing head includes a facing tool slide, wherein said tool slide includes a tool having a central tightening screw, means in the facing slide to prevent rotation of the tool when clamped in position, an index pin mounted behind said facing head, said facing head having a fitting bore therein, means for introducing said pin into said fitting bore, and including a central tightening screw, a drive for rotating said index pin, and a multi-sided head at the end of said pin which penetrates into the facing head, said tightening screw having a multi-sided recess in the side facing said pin and said multi-sided head being insertable in said recess in order to establish a torsionally rigid joint.

References Cited
UNITED STATES PATENTS

| | | | |
|---|---|---|---|
| 1,442,659 | 1/1923 | Groene | 29—568 X |
| 1,663,556 | 3/1928 | Jones | 82—2(.6) |

FOREIGN PATENTS

| | | | |
|---|---|---|---|
| 1,492,649 | 7/1967 | France | 29—568 |

LEONIDAS VLACHOS, Primary Examiner

U.S. Cl. X.R.

29—568; 90—11 A